(12) United States Patent
Ding (10) Patent No.: US 9,977,879 B2
(45) Date of Patent: May 22, 2018

(54) MULTIMEDIA DATA METHOD AND ELECTRONIC DEVICE (71) Applicant: NANNING FUGUI PRECISION INDUSTRIAL CO., LTD., Nanning (CN)

(72) Inventor: Shang-Jue Ding, Shenzhen (CN)

(73) Assignee: NANNING FUGUI PRECISION INDUSTRIAL CO., LTD., Nanning (CN)

( * ) Notice: Subject to any disclaimer, the term of this patent is extended or adjusted under 35 U.S.C. 154(b) by 89 days.

(21) Appl. No.: 15/132,264

(22) Filed: Apr. 19, 2016

(65) Prior Publication Data

US 2016/0378957 A1    Dec. 29, 2016

(30) Foreign Application Priority Data

Jun. 26, 2015 (CN) .......................... 2015 1 0364733

(51) Int. Cl.
*G06F 21/00* (2013.01)
*G06F 21/10* (2013.01)
*G10L 19/018* (2013.01)
*G10L 25/21* (2013.01)
*G06F 21/60* (2013.01)
*G10L 19/00* (2013.01)

(52) U.S. Cl.
CPC ............ *G06F 21/10* (2013.01); *G06F 21/604* (2013.01); *G10L 19/00* (2013.01); *G10L 19/018* (2013.01); *G10L 25/21* (2013.01); *G06F 2221/0748* (2013.01)

(58) Field of Classification Search
CPC ......... H04L 9/08; H04L 9/0861; H04L 9/088; G06F 21/10; G06F 21/105; G06F 21/16; G06F 21/60; G06F 21/604; G06F 21/62
See application file for complete search history.

(56) References Cited

U.S. PATENT DOCUMENTS

2005/0033579 A1* 2/2005 Bocko ................... G10L 19/018
704/273
2014/0039903 A1* 2/2014 Geyzel .................. G10L 19/018
704/500

FOREIGN PATENT DOCUMENTS

TW           201010408 A      3/2010

\* cited by examiner

*Primary Examiner* — Edward Zee
(74) *Attorney, Agent, or Firm* — ScienBiziP, P.C.

(57) ABSTRACT

An information security method operable to be executed in an electronic device with modules, such as a calculating module, a first determining module, an extracting module, a logic operation module, and an adjusting module. The modules find out audio segments which are suitable for the concealing of copyright and other information by way of phase inversion of the original data as audio codecs are applied and build the concealable information into the data by way of a key.

18 Claims, 10 Drawing Sheets

MULTIMEDIA DATA METHOD AND ELECTRONIC DEVICE

FIELD

The subject matter herein generally relates to information security.

BACKGROUND

With the development of multimedia technology and Internet, digital multimedia products can be issued via various channels, some may breach copyright protection.

An information concealing technology is used to convert individual information, for example, copyrights, trademarks or manufacturers, into a watermark, and the watermark is loaded and hidden into a multimedia file for verifying copies or tracking the source of illegal copies.

However, current watermarks are easily revised or removed, reducing security levels. An improved copyright information concealing method would be beneficial.

BRIEF DESCRIPTION OF THE DRAWINGS

Implementations of the present technology will now be described, by way of example only, with reference to the attached figures, wherein.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

References to "an" or "one" embodiment in this disclosure are not necessarily to the same embodiment, and such references mean "at least one."

In general, the word "module" as used hereinafter refers to logic embodied in computing or firmware, or to a collection of software instructions, written in a programming language, such as, Java, C, or assembly. One or more software instructions in the modules may be embedded in firmware, such as in an erasable programmable read only memory (EPROM). The modules described herein may be implemented as either software and/or computing modules and may be stored in any type of non-transitory computer-readable medium or other storage device. Some non-limiting examples of non-transitory computer-readable media include CDs, DVDs, BLU-RAY, flash memory, and hard disk drives. The term "comprising", when utilized, means "including, but not necessarily limited to"; it specifically indicates open-ended inclusion or membership in a so-described combination, group, series, and the like.

Figure 1:
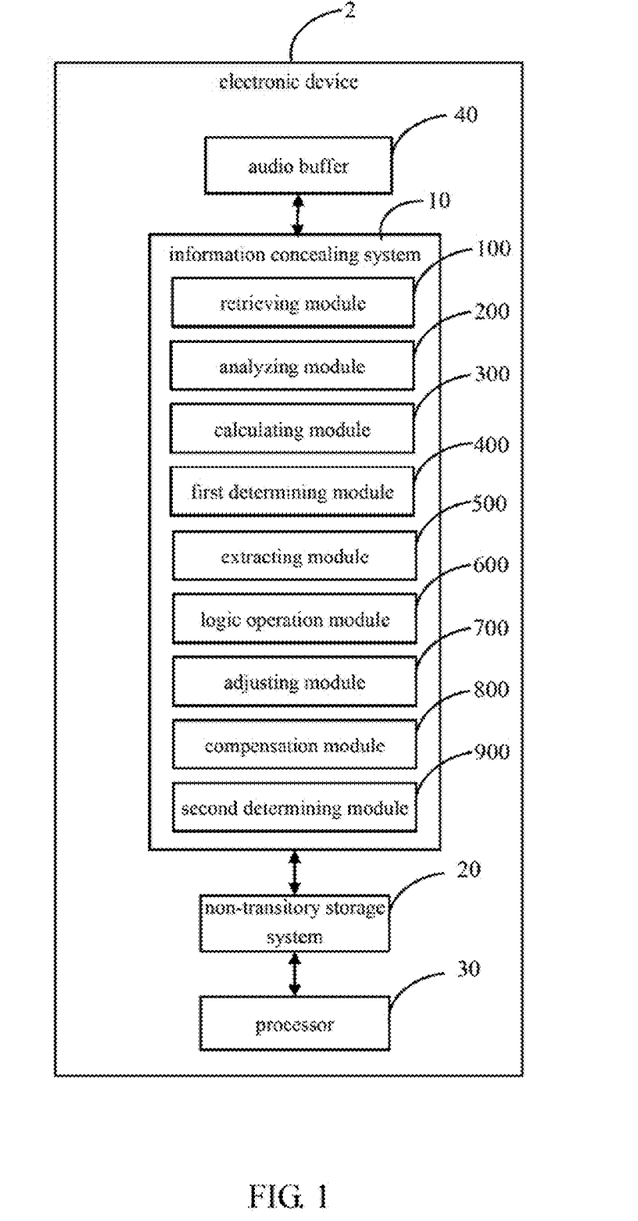
FIG. 1 illustrates a block diagram of an embodiment of functional modules of an electronic device which is able to apply security protection to its data.

FIG. 1 illustrates functional modules of a system for concealing information in audio data (information concealing system 10). In one embodiment, an electronic device 2 includes an information concealing system 10, a non-transitory storage system 20, at least one processor 30, and an audio buffer 40. The audio buffer 40 is configured to store pre-processed audio data. In one embodiment, the electronic device 2 may be any computing device able to apply digital processing such as by using codecs, but codec programs or devices are not to be taken as a limitation to the present disclosure.

The information concealing system 10 includes a retrieving module 100, an analyzing module 200, a calculating module 300, a first determining module 400, an extracting module 500, a logic operation module 600, an adjusting module 700, a compensation module 800, and a second determining module 900. The modules 100-900 can include computerized code in the form of one or more programs that are stored in the non-transitory storage system 20. The computerized code includes instructions that are executed by the at least one processor 30 to provide functions for the modules 100-900. In at least one embodiment, the non-transitory storage system 20 may include a hard disk drive, a flash memory, and a cache or another computerized memory device. In one embodiment, the information concealing system 10 processes pre-processed audio data stored in the audio buffer 40 to obtain desired audio segments. Then, the information concealing system 10 sequentially loads information into the desired audio segments through phase value adjustment, as concealed information. In one embodiment, the phase value adjustment includes, but is not limited to, phase inversion which means "adjusting phase by 180 degrees."

"Audio segment" means "one segment of audio data". Detailed descriptions of the functions of the described modules 100-900 are given below.

The retrieving module 100 retrieves a first audio segment from pre-processed audio data according to a predetermined time length. The time length is decided by users, the audio segment is configured with a sample point. In one embodiment, the retrieving module 100 may retrieve, from the pre-processed audio data, audio segments with 0.02 seconds (0.02 S) per frame. In addition, the retrieving module 100 can retrieve the first audio segment from the middle of the pre-processed audio data, and then retrieve subsequent audio segments on a segment-by-segment basis following the first audio segment. For example, where an item of audio has audio data of 600 seconds (600 S) playing time, the retrieving module 100 retrieves a first audio segment at the start of 111 seconds (111 S), a second audio segment at the start of 111+0.02 seconds (111+0.02 S), a third audio segment at the start of 111+0.04 seconds (111+0.04 S), and the above operation is repeated to retrieve other audio segments.

The calculating module 300 calculates a differential value of the first audio segment retrieved from the retrieving module 100. In one embodiment, the differential value may be a volume difference value which is calculated according to a difference operation. Here, volume, as maximum values above and below zero is used to measure energy of the first audio segment. In one embodiment, the differential value may be a calculated according to another audio parameter, for example, musical pitch.

Figure 3:
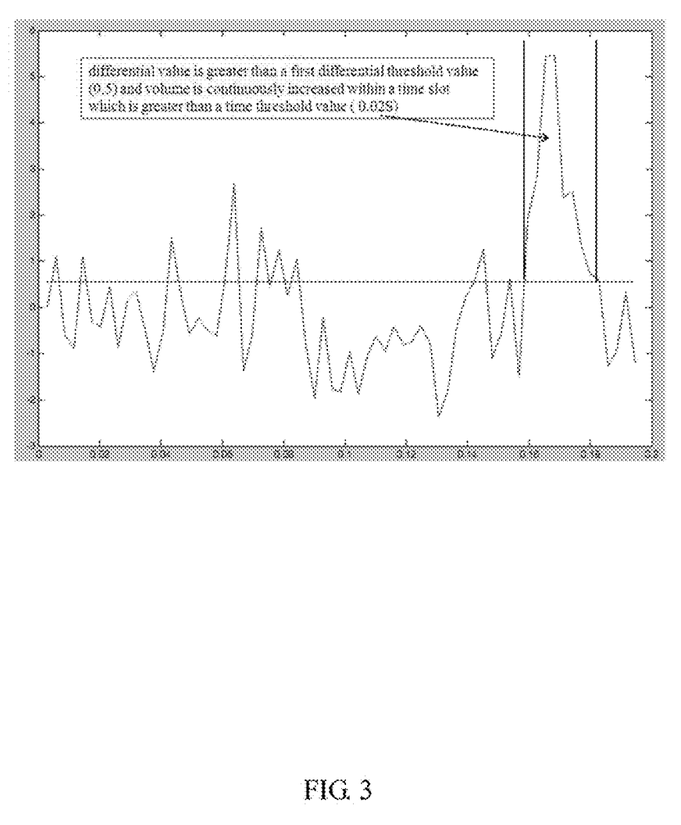
FIG. 3 illustrates a diagrammatic view of an embodiment of differential values of several audio segments of the pre-processed audio data shown in FIG. 2.
Figure 4:
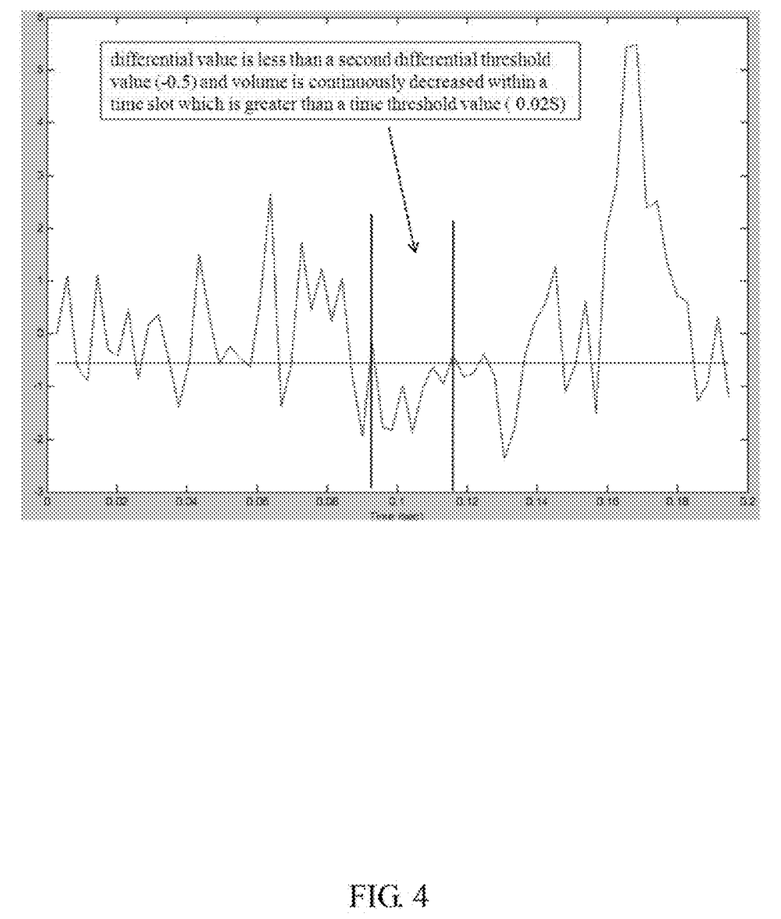
FIG. 4 illustrates a diagrammatic view of an embodiment of differential values of several audio segments of the pre-processed audio data shown in FIG. 2.

The first determining module 400 determines whether the first audio segment is suitable for the concealing of information, for example whether a watermark can be loaded therein, based on the differential value. In one embodiment, the first determining module 400 further predetermines a first threshold value and a second threshold value, and will determine that the first audio segment is suitable for watermark-loading when the differential value is greater than the first threshold value or less than the second threshold value. With reference to FIGS. 3 and 4, for example, when the differential value of an audio segment is greater than 0.5 or less than −0.5, the first determining module 400 can determine that the audio segment is suitable for watermark-loading. In one embodiment, audio parameters (e.g. the first threshold value and the second threshold value) can be preset by users.

Figure 5:
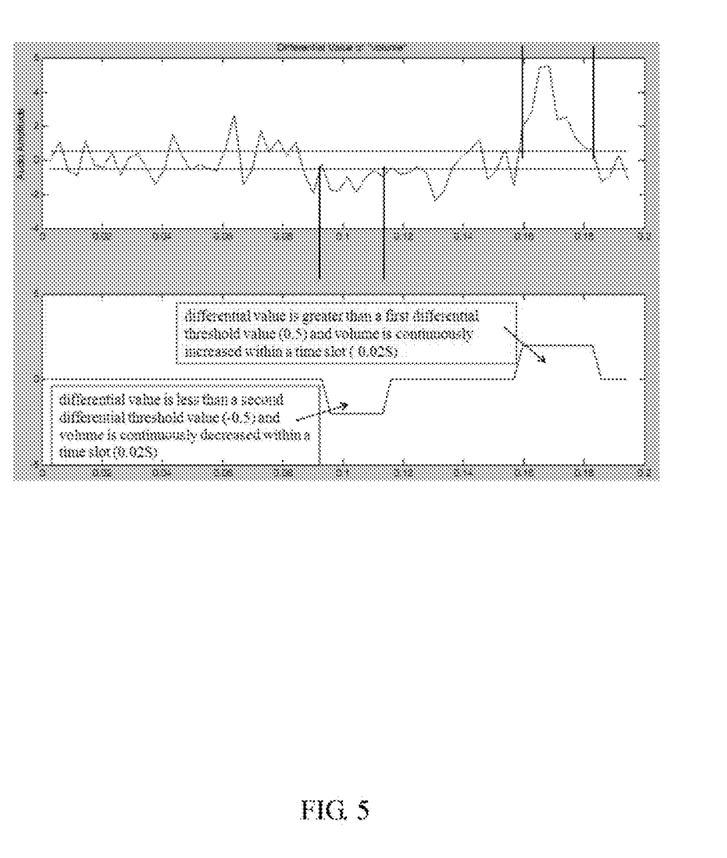
FIG. 5 illustrates diagrammatic views of an embodiment of differential values and characteristic values corresponding to the audio segments shown in FIGS. 3 and 4.

The extracting module 500 extracts audio characteristic value of the first audio segment when it is deemed suitable for information concealing (e.g. watermark-loading). In one embodiment, the audio characteristic value comprises a first characteristic value and a second characteristic value. With reference to FIG. 5, for example, the extracting module 500 extracts the first characteristic value (e.g. 1) when volume of an audio segment is continuously increased within a time slot which is greater than a time threshold value (e.g. 0.02 seconds), or can extract the second characteristic value (e.g. 0) when volume of an audio segment is continuously decreased within a time slot which is greater than the/another time threshold value (e.g. 0.02 seconds).

The logic operation module 600 performs a logic operation on a bit value of information to be concealed (e.g. the watermark) and the audio characteristic value to generate a bit value of a key. In one embodiment, in order to conceal the information to be concealed (e.g. watermarking information) into the first audio segment as well as eliminate correlation of adjacent elements, the information to be concealed (e.g. watermarking information) and the audio characteristic value are configured to be processed by a logic operation, to generate the key. The logic operation may be exclusive or (XOR), simple or (OR), or simple addition (AND), etc.

Detailed descriptions of the functions of the logic operation module 600 are given by example. In the embodiment, a target segment means an audio segment which is suitable for the concealing of information (watermark-loading). When a first target segment is found with audio characteristic value of "1" and the encoding/pseudo-coding of the watermark is "1010101011011", the logic operation module 600 performs a logic operation (e.g. XOR) on the audio characteristic value of the first target segment "1" and the first bit value of "1010101011011", which is represented as "1" XOR "1"="0". Thus, a first bit value of "0" is generated for the key. When a second target segment is found, the logic operation module 600 performs the logic operation (e.g. XOR) on the audio characteristic value of the second target segment and a second bit value of "1010101011011" is found from which to generate a second bit value for the key . . . . The steps are repeated and the flow is terminated when each of the bit values of "1010101011011" is completely processed, to generate an overall key corresponding to the watermark "1010101011011."

The adjusting module 700 adjusts phase of the first audio segment based on the bit value of the key, thereby concealing/loading the bit value of key into the first audio segment. In one embodiment, considering the human hearing characteristics and the well-known low susceptibility to adjustment of phase, adjustment of phase is an acceptable way for concealing the concealable information (e.g. loading the watermark). In one embodiment, the key may be composed of several binary numbers, the first value may be 1, and the second value may be 0. The adjusting module 700 inverts the phase of the sample point of the first audio segment when the bit value of key is the first value of 1 but does nothing to the phase of the sample point when the bit value of key is the second value 0. Through above-described inversion process, the key can be concealed/loaded into the pre-processed audio data. It is noted that, the electronic device 2 adjusts phase of audio data itself by way of phase inversion, it does not load additional information or superimpose data onto the basic audio data. Information which is hidden/loaded into the audio data has better conceal-ability and higher security.

Figure 6:
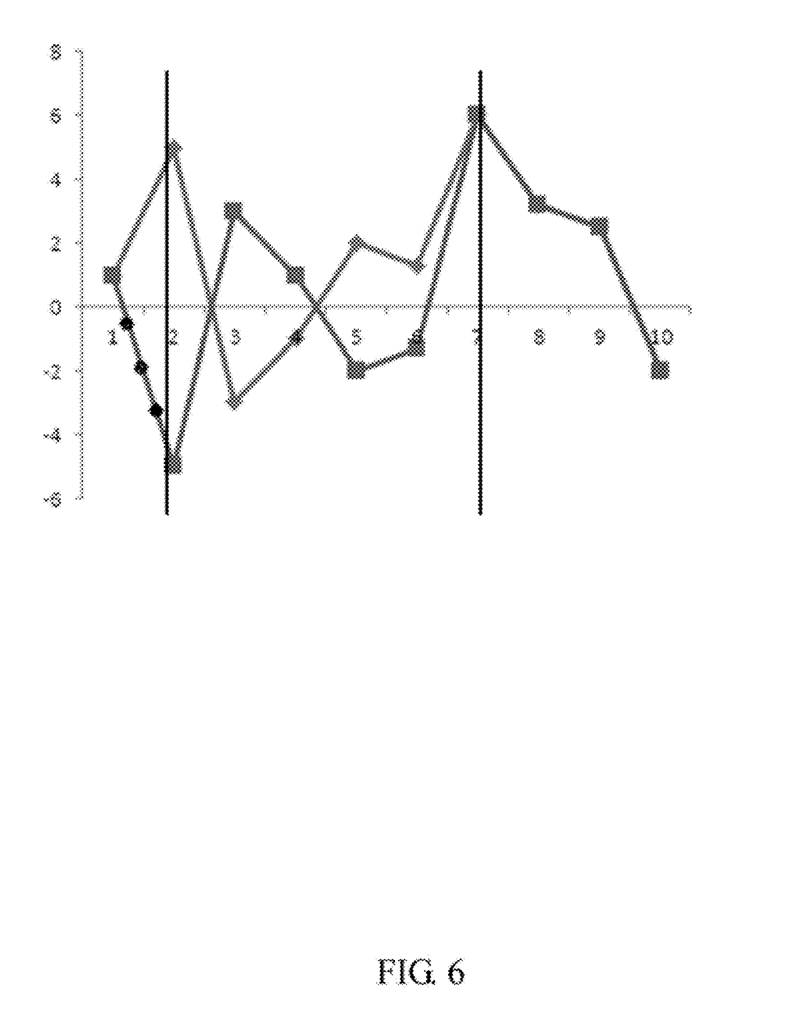
FIG. 6 illustrates a diagrammatic view of an embodiment of multi-point interpolation for an audio segment.

The compensation module 800 implements multi-point interpolation to a starting position of the phase adjustment. Referring to FIG. 6, the compensation module 800 implements multi-point interpolation between the starting position of the phase adjustment and an adjacent sample point, for the smooth processing of the first audio segment.

The second determining module 900 determines whether the information to be concealed (e.g. watermark) is completely loaded. If the information to be concealed has not been loaded completely, the retrieving module 100 retrieves the next audio segment.

Figure 2:
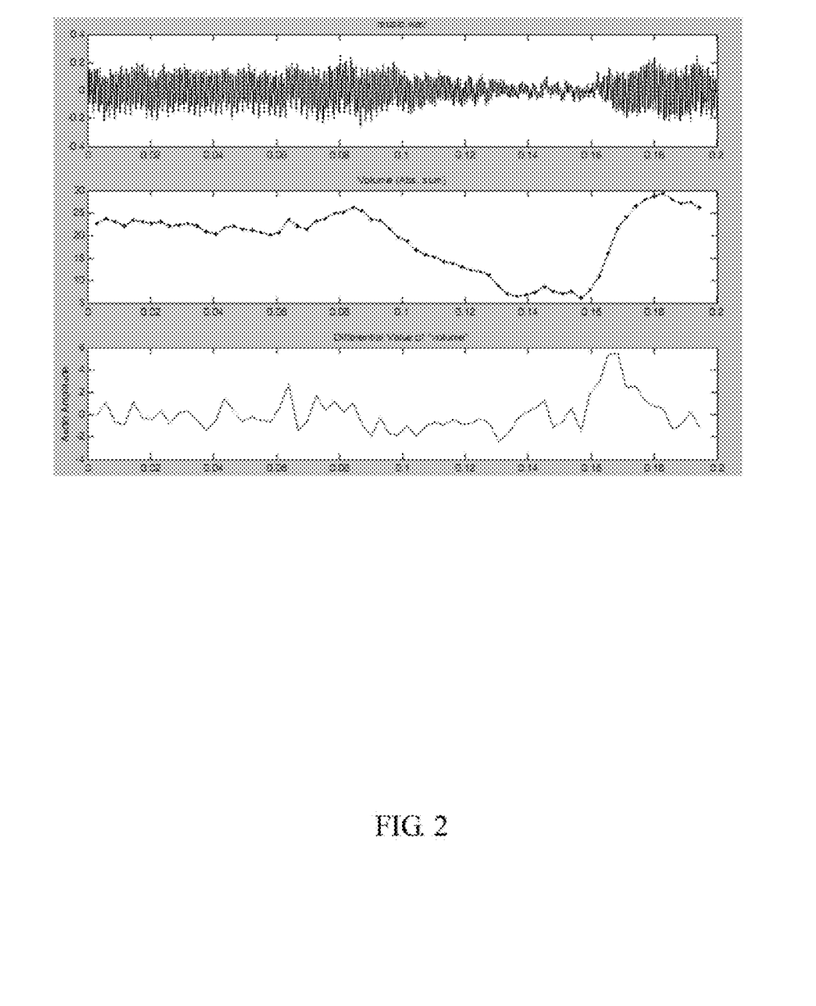
FIG. 2 illustrates diagrammatic views of an embodiment of wave forms, amplitudes, and differential values corresponding to pre-processed audio data.

In one embodiment, the watermark loading system 10 further includes the analyzing module 200. The analyzing module 200 is configured to analyze an energy distribution pattern of the first audio segment and calculates the differential value via the energy distribution pattern (as shown in FIG. 2).

Figure 7:
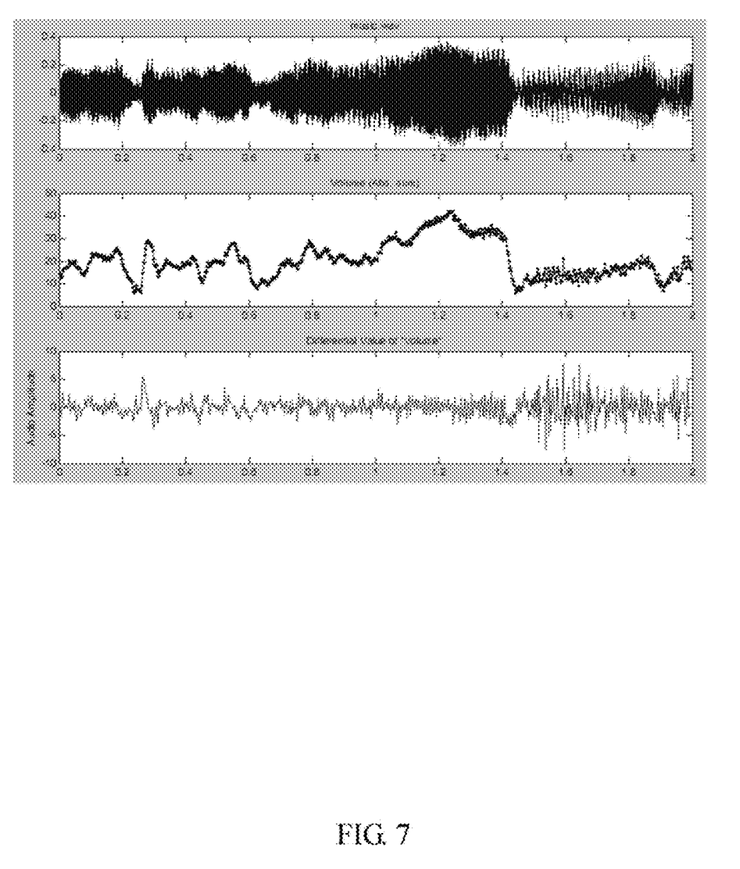
FIG. 7 illustrates diagrammatic views of another embodiment of wave forms, amplitudes, and differential values corresponding to other pre-processed audio data.
Figure 8:
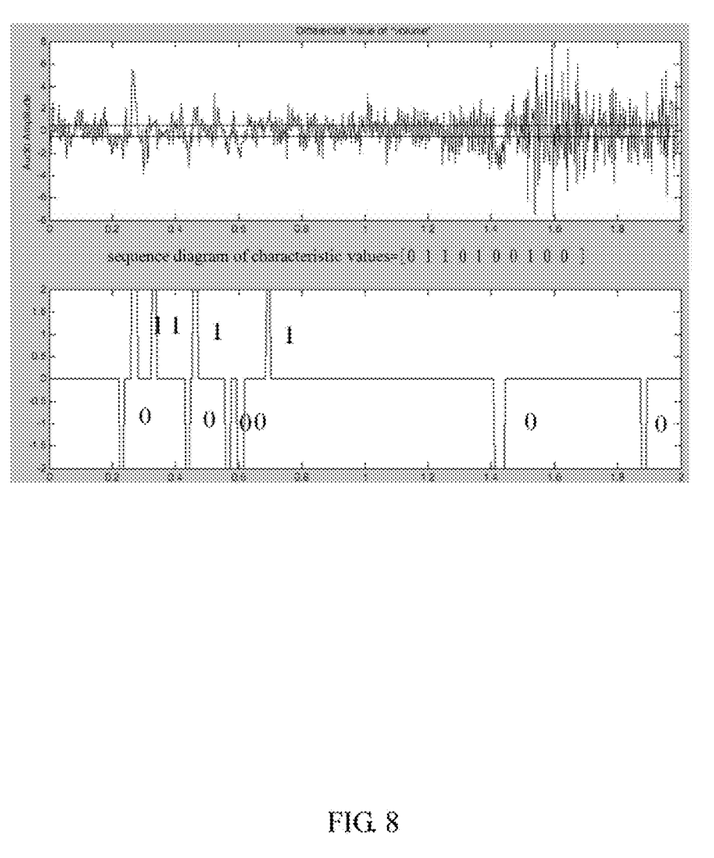
FIG. 8 illustrates a sequence diagram of an embodiment of characteristic values based on the values of data shown in FIG. 7.

An exemplary embodiment is given with reference to FIGS. 7 and 8. The audio data is 2 seconds long and the watermark is "1000011101" (i.e. encoding/pseudo-coding of the watermark). The retrieving module 100 of the electronic device 2 retrieves audio segments with segment after segment which are each 0.02 seconds and then analyzes and calculates volume difference values of each of the audio segments (distribution of the differential values of volume is shown in FIG. 7). In the embodiment, A target segment means an audio segment which is suitable for watermark-loading (the volume difference value great than 0.5 or less than −0.5). Target segments are easy to be obtained from the audio segments according to the FIG. 7. Next, the extracting module 500 extracts characteristic values of the target segments, where the extracted characteristic values are "0110100100" (the sequence diagram of characteristic values is shown in FIG. 8). Next, the logic operation module 600 performs a logic operation (e.g. XOR) on the watermark "1000011101" and the extracted characteristic values "0110100100" to generate key values of "1101111001", represented as 0110100100 XOR 1011011101=1101111001. Finally, the adjusting module 700 inverts phase of the target segments based on "1101111001" as the values of the key, and loads the individual key values into the target segments.

Figure 9:
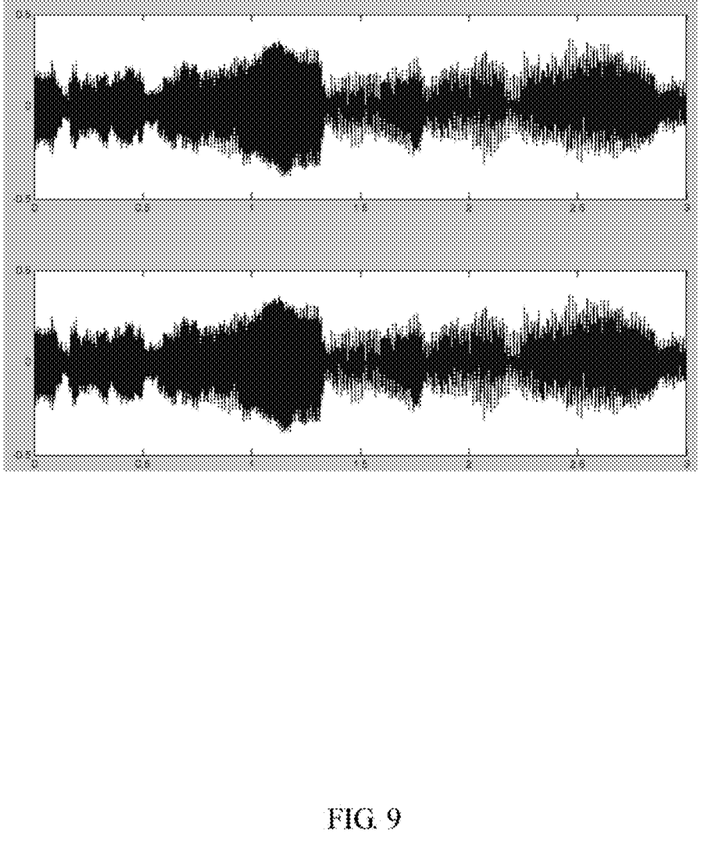
FIG. 9 is a diagrammatic view of an embodiment of audio wave forms comparisons before and after information concealing.

FIG. 9 is a diagrammatic view of an embodiment of audio waveform comparisons before and after the concealing of information (after watermark-loading). There is no significant difference between the watermarked audio compared to the original audio, which indicates that the watermarking has no effect on the original audio and will not affect the quality of the original audio.

Figure 10:
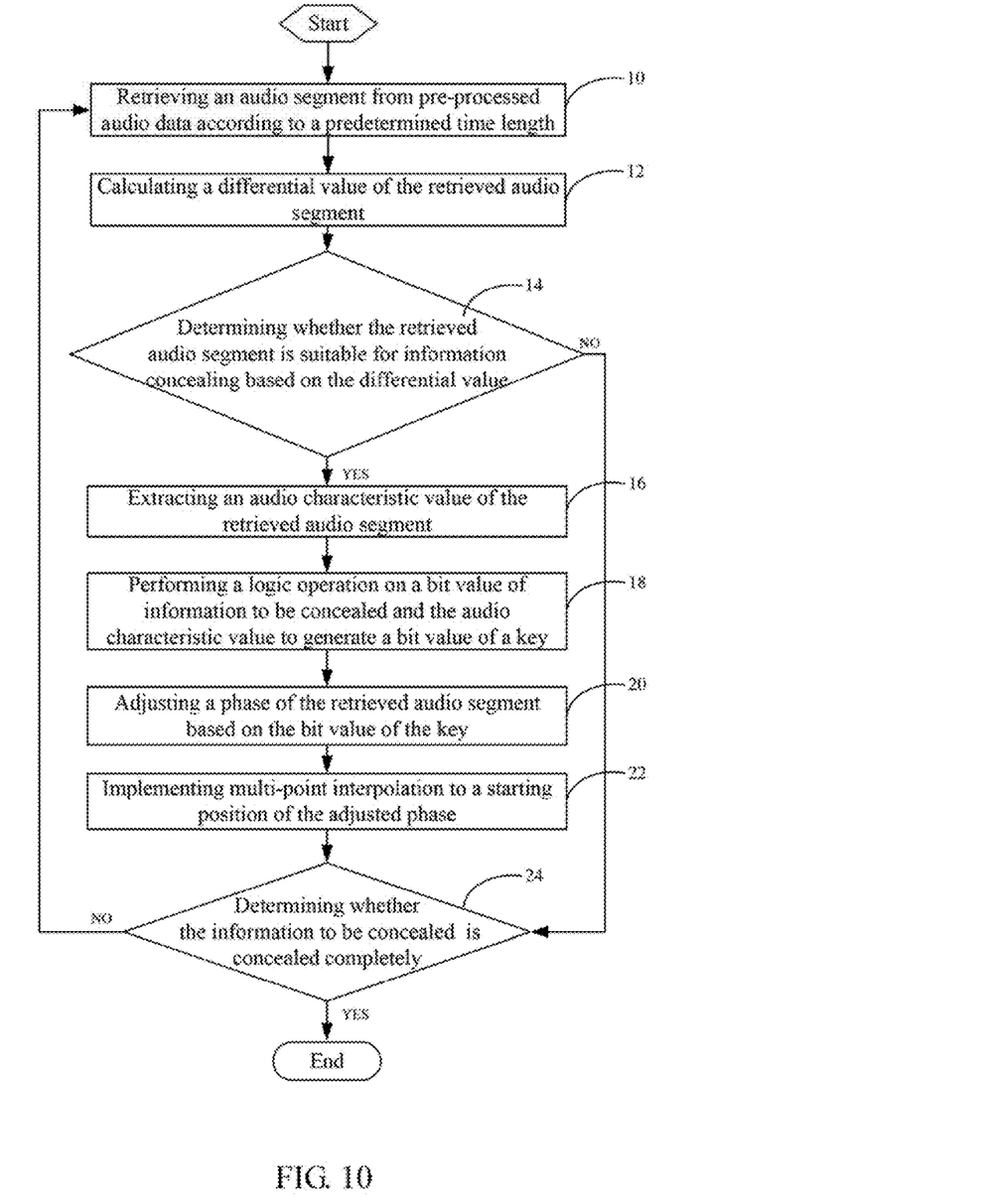
FIG. 10 illustrates a flowchart of an embodiment of an information concealing method.

FIG. 10 illustrates a flowchart of an embodiment of an information concealing method. The method is provided by way of example, as there are a variety of ways to carry out the method. The method is operable to be executed in the electronic device. Additionally, the illustrated order of blocks is by example only and the order of the blocks can change. The method can begin at block 10.

At block 10, the electronic device retrieves an audio segment (if the audio segment is an audio segment retrieved for the first time in retrieving operations, hereinafter, a first audio segment) from pre-processed audio data according to a predetermined time length. The time length is decided by users, the audio segment is configured with a sample point. In one embodiment, the electronic device may retrieve, from the pre-processed audio data, audio segments with 0.02 seconds (0.02 S) per frame. In addition, the electronic device can retrieve the first audio segment from the middle of the pre-processed audio data, and then retrieve subsequent audio segments on a segment-by-segment basis following the first audio segment.

At block 12, the electronic device calculates a differential value of the first audio segment. In one embodiment, the differential value may be a volume difference value which is calculated according to a difference operation. In one embodiment, the differential value may be a calculated according to another audio parameter, for example, musical pitch.

At block 14, the electronic device determines whether the first audio segment is suitable for the concealing of information, for example, whether a watermark can be loaded therein, based on the differential value. In one embodiment, the electronic device further predetermines a first threshold value and a second threshold value, and will determine that that the first audio segment is suitable for the concealing of information when the differential value is greater than the first threshold value or the that is less than the second threshold value. Detail can refer to the exemplary embodiment with reference to FIGS. 2 and 3. If the electronic device determines that the first audio segment is not suitable for the concealing of information, the flowchart goes to block 24.

At block 16, the electronic device extracts an audio characteristic value of the first audio segment when the first audio segment is suitable for the concealing of information (e.g. watermark-loading). In one embodiment, the audio characteristic value comprises a first characteristic value and a second characteristic value. With reference to FIG. 5, for example, the electronic device 2 extracts the first characteristic value (e.g. 1) when volume of an audio segment is continuously increased within a time slot which is greater than a time threshold value (e.g. 0.02 seconds), or can extract the second characteristic value (e.g. 0) when volume of another audio segment is continuously decreased within a time slot which is greater than the/another time threshold value (e.g. 0.02 seconds). Wherein, the length of the time slot is determined by user, which is not greater than the length of an audio segment, with reference to FIGS. 3, 4 and 5, length of a time slot is equal to length of an audio segment.

At block 18, the electronic device performs a logic operation on a bit value of information to be concealed (e.g. the watermark) and the audio characteristic value to generate a bit value of a key. In one embodiment, the logic operation may be XOR, simple or (OR), or simple addition (AND), NOT and etc.

At block 20, the electronic device adjusts phase of the first audio segment based on the bit value of the key, thereby concealing/loading the bit value of key into the first audio segment. In one embodiment, the key may be composed of several binary numbers, the first value may be 1, and the second value may be 0. The electronic device 2 inverts the phase of the sample point when the bit value of key is a first value 1; but does nothing to the phase of the sample point when the bit value of key is a second value 0.

At block 22, the electronic device implements multi-point interpolation to a starting position of the phase adjustment. Referring to FIG. 6, the electronic device implements multi-point interpolation between the starting position of the phase adjustment and an adjacent sample point, for the smooth processing of the first audio segment.

At block 24, the electronic device determines whether or not the information to be concealed (e.g. watermark) is completely loaded. If the information to be concealed (e.g. watermark) has not been loaded completely, the flowchart goes back to block 10, the electronic device retrieve the next audio segment.

In one embodiment, the method further includes block 11 which the electronic device analyzes an energy distribution pattern of the first audio segment and calculates the differential value via the energy distribution pattern (as shown in FIG. 2).

The embodiments shown and described above are only examples. Many details are often found in the art such as the other features of an SDN controller. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:
1. A method, comprising:
retrieving an audio segment from pre-processed audio data according to a predetermined time length;
calculating a differential value of the retrieved audio segment;
determining whether the retrieved audio segment is suitable for information concealing based on the differential value;
extracting an audio characteristic value of the retrieved audio segment when the retrieved audio segment is suitable for information concealing, wherein the extracting step further comprises:
    extracting a first characteristic value when volume of the retrieved audio segment is continuously increased within a time slot which is greater than a time threshold value;
    extracting a second characteristic value when volume of the retrieved audio segment is continuously decreased within a time slot which is greater than a time threshold value;
performing a logic operation on a bit value of information to be concealed and the audio characteristic value to generate a bit value of a key; and
adjusting a phase of the retrieved audio segment based on the bit value of the key, thereby concealing the bit value of the key into the retrieved audio segment.

2. The method as claimed in claim 1, wherein the retrieving step further comprises:
    analyzing an energy distribution pattern of the retrieved audio segment and calculating the differential value via the energy distribution pattern.

3. The method as claimed in claim 1, wherein the calculating step further comprises:
    calculating a volume difference value of the retrieved audio segment using a difference method.

4. The method as claimed in claim 1, wherein the determining step further comprises:
    predetermining a first differential threshold value and a second differential threshold value;
    determining that the retrieved audio segment is suitable for information concealing when:
        the differential value is greater than the first differential threshold value; or
        the differential value is less than the second differential threshold value.

5. The method as claimed in claim 1, wherein the adjusting step further comprises:
    setting a sampling point of the retrieved audio segment;
    inversing phase of the sample point when the bit value of the key is equal to a first value; and
    doing nothing to the phase of the sample point when the bit value of the key is equal to a second value.

6. The method as claimed in claim 1, after the step of adjusting phase, further comprising:
    implementing multi-point interpolation to a starting position of the adjusted phase.

7. An electronic device, comprising:
    at least one processor;
    a non-transitory storage system coupled to the at least one processor and configured to store one or more programs that are executed by the at least one processor, the one or more programs including instructions for:
    retrieving an audio segment from pre-processed audio data according to a predetermined time length;
    calculating a differential value of the retrieved audio segment;
    determining whether the retrieved audio segment is suitable for information concealing based on the differential value;
    extracting an audio characteristic value of the retrieved audio segment when the retrieved audio segment is suitable for information concealing, wherein the extracting step further comprises:
        extracting a first characteristic value when volume of the retrieved audio segment is continuously increased within a time slot which is greater than a time threshold value;
        extracting a second characteristic value when volume of the retrieved audio segment is continuously decreased within a time slot which is greater than a time threshold value;
    performing a logic operation on a bit code value of information to be concealed and the audio characteristic value to generate a bit value of a key; and
    adjusting a phase of the retrieved audio segment based on the bit value of the key, thereby concealing the bit value of the key into the retrieved audio segment.

8. The electronic device as claimed in claim 7, wherein the retrieving step further comprises:
    analyzing an energy distribution pattern of the retrieved audio segment and calculating the differential value via the energy distribution pattern.

9. The electronic device as claimed in claim 7, wherein the calculating step further comprises:
    calculating a volume difference value of the retrieved audio segment using a difference method.

10. The electronic device as claimed in claim 7, wherein the determining step further comprises:
    predetermining a first differential threshold value and a second differential threshold value;
    determining that the retrieved audio segment is suitable for information concealing when:
        the differential value is greater than the first differential threshold value; or
        the differential value is less than the second differential threshold value.

11. The electronic device as claimed in claim 7, wherein the adjusting step further comprises:
    setting a sampling point of the retrieved audio segment;
    inversing phase of the sample point when the bit value of the key is equal to a first value; and
    doing nothing to the phase of the sample point when the bit value of the key is equal to a second value.

12. The electronic device as claimed in claim 7, after the step of adjusting phase, further comprising:
    implementing multi-point interpolation to a starting position of the adjusted phase.

13. A non-transitory storage medium storing executable program instructions which, when executed by a processing system, cause the processing system to perform a method comprising:
    retrieving an audio segment from pre-processed audio data;
    extracting an audio characteristic value of the audio segment, wherein a first characteristic value is extracted when volume of the audio segment is continuously increased within a time slot which is greater than a time threshold value, a second characteristic value is extracted when volume of the audio segment is continuously decreased within a time slot which is greater than a time threshold value;
    performing a logic operation on a bit value of information to be concealed and the audio characteristic value to generate a bit value of a key; and
    adjusting a phase of the audio segment based on the bit value of the key, thereby concealing the bit value of the key into the audio segment.

14. The non-transitory storage medium as claimed in claim 13, further comprising:
    determining whether the audio segment is suitable for information concealing, wherein the step of extracting the audio characteristic value of the audio segment is performed when the audio segment is suitable for information concealing.

15. The non-transitory storage medium as claimed in claim 14, the determining step further comprises:
   determining that the audio segment is suitable for information concealing when:
      a differential value of the audio segment is greater than a first differential threshold value; or
      the differential value of the audio segment is less than a second differential threshold value.

16. The non-transitory storage medium as claimed in claim 15, wherein the differential value of the audio segment is a volume difference value of the audio segment which is calculated using a difference method.

17. The non-transitory storage medium as claimed in claim 13, wherein the adjusting step further comprises:
   setting a sampling point of the audio segment;
   inversing phase of the sample point when the bit value of the key is equal to a first value; and
   doing nothing to the phase of the sample point when the bit value of the key is equal to a second value.

18. The non-transitory storage medium as claimed in claim 13, after the step of adjusting phase, further comprising:
   implementing multi-point interpolation to a starting position of the adjusted phase.

\* \* \* \* \*